April 2, 1940.  W. J. MORRILL  2,195,993
FLEXIBLE COUPLING
Filed Dec. 23, 1938

Inventor:
Wayne J. Morrill,
by Harry E. Dunham
His Attorney.

Patented Apr. 2, 1940

2,195,993

UNITED STATES PATENT OFFICE 2,195,993

FLEXIBLE COUPLING

Wayne J. Morrill, Fort Wayne, Ind., assignor to General Electric Company, a corporation of New York Application December 23, 1938, Serial No. 247,459

9 Claims. (Cl. 64—11)

My invention relates to flexible couplings.

An object of my invention is to provide an improved coupling for connecting two shafts which may not be in perfect alignment or which may be subject to vibrations.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
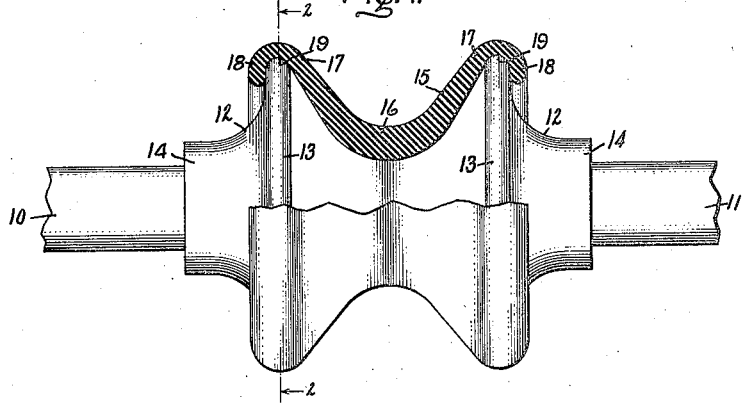
Figure 2:
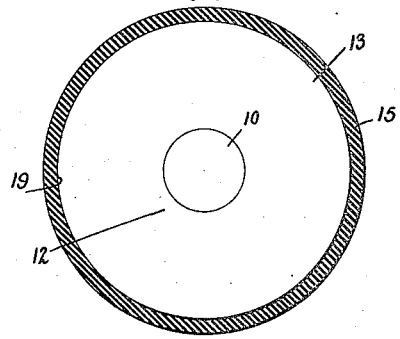

In the drawing, Fig. 1 is a side elevational view of my coupling, partly broken away, to show the configuration of the resilient flexible coupling; Fig. 2 is an end view of the coupling shown in Fig. 1 with the coupling member cut away along line 2—2; and Fig. 3 is a view similar to Fig. 2 of another modification of my coupling.

Referring to the drawing, I have shown two shafts 10 and 11 on the end of each of which is mounted a disk-shaped coupling element 12 formed with an annular radially extending flange 13. The coupling elements 12 are provided with hubs 14 having central openings therein which are press fitted on the ends of the shafts 10 and 11, or may be secured thereto in any other suitable manner, as by keys or set screws. The two spaced apart coupling elements 12 are connected together by a substantially hollow tubular flexible member 15 extending therebetween, which is formed of resilient material, such as resilient rubber or fabric impregnated with vulcanized rubber, and arranged to have less flexibility at its central portion 16 than adjacent the ends 17 thereof. In order to obtain this difference in flexibility, the central portion 16 is formed of a thicker section of material than the ends 17 and also is of a smaller diameter at this middle portion than adjacent the ends 17. In order to provide a reliable connection between the flexible member 15 and the coupling elements 12, I provide an inwardly extending annular flange 18 adjacent each end of the flexible member, so as to provide an annular groove 19 which is arranged in frictional radially clamping engagement with the annular flange 13 of the coupling element. The internal diameter of the grooves 19 is made slightly smaller than the external diameter of the annular flanges 13 to provide a predetermined amount of radial clamping pressure to insure the necessary friction therebetween and prevent slippage and wear when load is transmitted through the coupling. I have found that with this type coupling, it is not necessary to provide any additional elements for securing the flexible member to the coupling elements, as with increase in load there is a tendency to twist the flexible member 15, and this twisting force creates an additional inward radial force upon the grooves 19 which increase the clamping pressure between the flexible member and the flanges 13 of the coupling elements, so that the radial clamping force varies in accordance with variations in load transmitted by the coupling. In order better to carry out this feature of my invention and further to eliminate the tendency of such a coupling to collapse under load, the portion of the flexible member 15 between the ends 17 is formed in the shape of a catenary of revolution.

Figure 3:
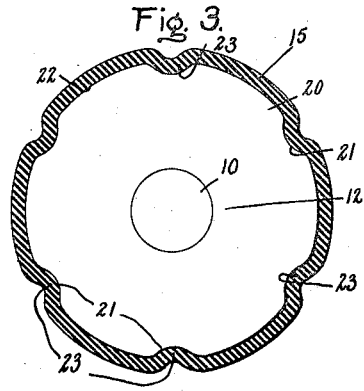

Fig. 3 shows another modification of my coupling and is particularly adaptable where slightly higher loads are to be transmitted by the coupling, and where it is desirable further to insure against creep and wear. In this construction, the coupling elements 12 are provided with radially extending annular flanges 20, which are formed with a plurality of indentations 21 in the outer periphery thereof, and the flexible member 15 is formed with a groove 22, similar to the groove 19, which is provided with a plurality of projections 23 arranged in engagement with the indentations 21 in the flanges 20. These complementary indentations 21 and projections 23 provide a better grip between the coupling elements and the flexible member 15 and insure a more positive connection therebetween than the arrangement shown in Figs. 1 and 2.

While I have illustrated and described two embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A coupling including two spaced apart elements to be coupled, and a substantially tubular flexible member extending therebetween, said flexible member having an inturned flexible flange adjacent each of the two ends thereof, each of said flanges being arranged to provide a frictional radially clamping engagement of an end of said flexible member with one of said two elements.

2. A coupling including two spaced apart elements to be coupled having an annular flange formed thereon, and a substantially tubular member of resilient material extending therebetween having an inturned annular flange providing a groove adjacent each of the two ends thereof, the diameter of each of said grooves being smaller than said element annular flanges and each groove being arranged about one of said two element annular flanges to provide a frictional radially clamping engagement between said elements and said resilient member.

3. A coupling including two spaced apart elements to be coupled, and a substantially tubular flexible member extending therebetween, said flexible member having an inturned flexible flange providing a groove adjacent each of two ends thereof, each of said grooves being arranged in frictional radially clamping engagement about one of said two elements, said flexible member having a different diameter at its middle portion than adjacent said flexible flanges to provide a variation in radial clamping force corresponding to variations in load transmitted thereby.

4. A coupling including two spaced apart elements to be coupled, and a substantially tubular flexible member extending therebetween, said flexible member having an inturned flexible flange providing a groove adjacent each of two ends thereof, each of said grooves being arranged in frictional radially clamping engagement about one of said two elements, said flexible member having less flexibility and a different diameter at its middle portion than adjacent said flexible flanges to provide a variation in radial clamping force corresponding to variations in load transmitted thereby.

5. A coupling including two elements to be coupled, and a member of resilient material extending therebetween, said resilient member having an inturned annular flange providing a groove adjacent each of the two ends thereof arranged in frictional radially clamping engagement about one of said two elements, said resilient material member having a smaller diameter at its middle portion than adjacent said two annular flanges to provide a variation in radial clamping force corresponding to variations in load transmitted thereby.

6. A coupling including two elements to be coupled, and a member of resilient material extending therebetween, said resilient member having an inturned annular flange providing a groove adjacent each of the two ends thereof arranged in frictional radially clamping engagement about one of said two elements, said resilient material member being of thicker section and having a smaller diameter at its middle portion than adjacent said two annular flanges to provide a variation in radial clamping force corresponding to variations in load transmitted thereby.

7. A coupling including two elements to be coupled, and a member of resilient material extending therebetween, said resilient member having substantially the shape of a catenary of revolution with an inturned flange providing a groove adjacent each of the two ends thereof, each of said grooves being of slightly smaller internal diameter than the external diameter of said two elements and arranged in frictional radially clamping engagement about one of said two clamping elements.

8. A coupling including two elements to be coupled each having an annular portion with indentations in the periphery thereof, and a substantially tubular member of resilient material extending therebetween having an inturned annular flange providing a groove adjacent each of the two ends thereof, said groove being formed with projections therein arranged in engagement with said indentations in said coupling elements and each of said grooves being arranged in frictional radially clamping engagement about one of said two elements.

9. A coupling including two elements to be coupled having an annular flange formed thereon, indentations formed in the outer periphery of each of said flanges, and a member of resilient material extending between said two elements, said resilient member having substantially the shape of a catenary of revolution with an inturned flange providing a groove adjacent each of the two ends thereof, said grooves having projections therein corresponding to said element flange indentations and each being arranged in frictional radially clamping engagement about one of said two element flanges.

WAYNE J. MORRILL.